(12) United States Patent
Fujiwara et al.

(10) Patent No.: US 7,109,663 B2
(45) Date of Patent: Sep. 19, 2006

(54) ELECTRON EMISSION DEVICE, ELECTRON SOURCE, AND IMAGE DISPLAY HAVING DIPOLE LAYER

(75) Inventors: Ryoji Fujiwara, Kanagawa (JP); Yoji Teramoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/853,180

(22) Filed: May 26, 2004

(65) Prior Publication Data

US 2004/0251812 A1  Dec. 16, 2004

(30) Foreign Application Priority Data

Jun. 11, 2003 (JP) .............................. 2003/165857
Mar. 22, 2004 (JP) .............................. 2004/082011

(51) Int. Cl.
*H01J 21/10* (2006.01)

(52) U.S. Cl. ...................... 315/169.4; 313/504; 257/88
(58) Field of Classification Search ............. 315/169.1, 315/169.4; 313/504, 506; 257/88, 79, 40
See application file for complete search history.

(56) References Cited

U.S. PATENT DOCUMENTS

| | | | | |
|---|---|---|---|---|
| 5,180,951 A | | 1/1993 | Dworsky et al. ......... | 315/169.3 |
| 5,283,501 A | | 2/1994 | Zhu et al. ................ | 315/169.3 |
| 5,861,707 A | | 1/1999 | Kumar ...................... | 313/309 |
| 6,008,502 A | * | 12/1999 | Deguchi et al. ............. | 257/10 |
| 6,876,007 B1 | * | 4/2005 | Yamazaki et al. ........... | 257/88 |

FOREIGN PATENT DOCUMENTS

| | | |
|---|---|---|
| JP | 2654012 | 5/1997 |
| JP | 9-199001 | 7/1997 |
| JP | 10-223130 | 8/1998 |
| JP | 2002-56771 | 2/2002 |
| JP | 2002-93305 | 3/2002 |
| JP | 2002-522878 | 7/2002 |
| JP | 2002-373569 | 12/2002 |
| JP | 2003-500795 | 1/2003 |
| JP | 2003-51243 | 2/2003 |
| JP | 2003-92056 | 3/2003 |
| WO | WO 00/10190 | 2/2000 |

OTHER PUBLICATIONS

Zhirnov et al. "Environmental Effect on the Electron Emission from Diamond Surfaces," J. Vac. Sci. Technol. B 16 (3), May/Jun. 1998, pp. 1188-1193.

Hart et al., *Field Emission from Tetrahedral Amorphous Carbon as a Function of Surface Treatment and Substrate Material*, Appl. Phys. Lett., vol. 74, No. 11, (1999) pp. 1594-1596.

Robertson, J., *Amorphous Carbon Cathodes for Field Emission Display*, Thin Solid Films 296 (1997), pp. 61-65.

(Continued)

*Primary Examiner*—Trinh V. Dinh
*Assistant Examiner*—Jimmy Vu
(74) *Attorney, Agent, or Firm*—Fitzpatrick, Cella, Harper & Scinto

(57) ABSTRACT

An electron emission device is provided which has sufficient on/off characteristics and is capable of efficiently emitting electrons with a low voltage. An electron emission device includes a substrate, a cathode electrode, a gate electrode, which are arranged on the substrate, an insulation layer covering the surface of the cathode electrode, and a dipole layer formed by terminating the surface of the insulation layer with hydrogen.

18 Claims, 14 Drawing Sheets

OTHER PUBLICATIONS

Forbes, R.G., *Low-Macroscopic-Field Electron Emission from Carbon Films and Other Electrically Nanostructured Heterogeneous Materials: Hypotheses About Emission Mechanism*, Solid State Electronics 45 (2001) pp. 779-808.

Robertson, J., *Mechanisms of Electron Field Emission from Diamond, Diamond-like Carbon, and Nanostructured Carbon*, J. Vac. Sci. Technol. B 17(2) (1999) pp. 659-665.

\* cited by examiner

FIG. 2A
FIG. 2B
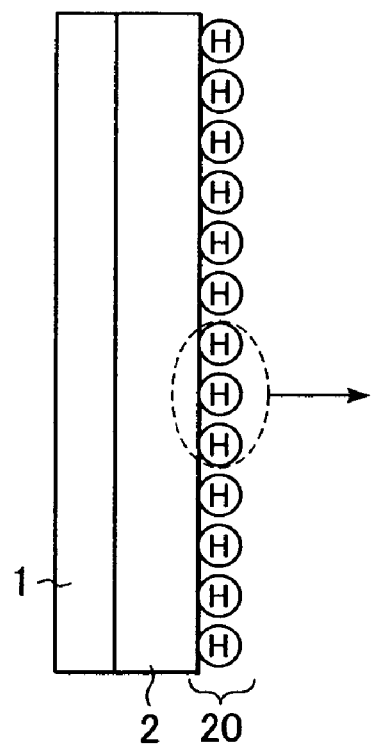
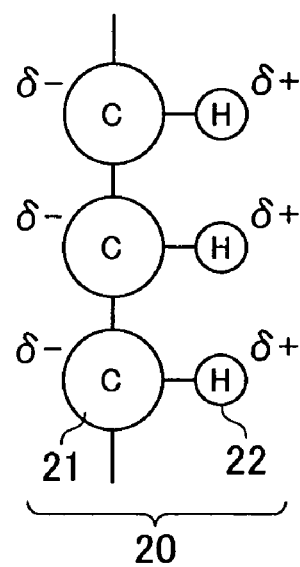

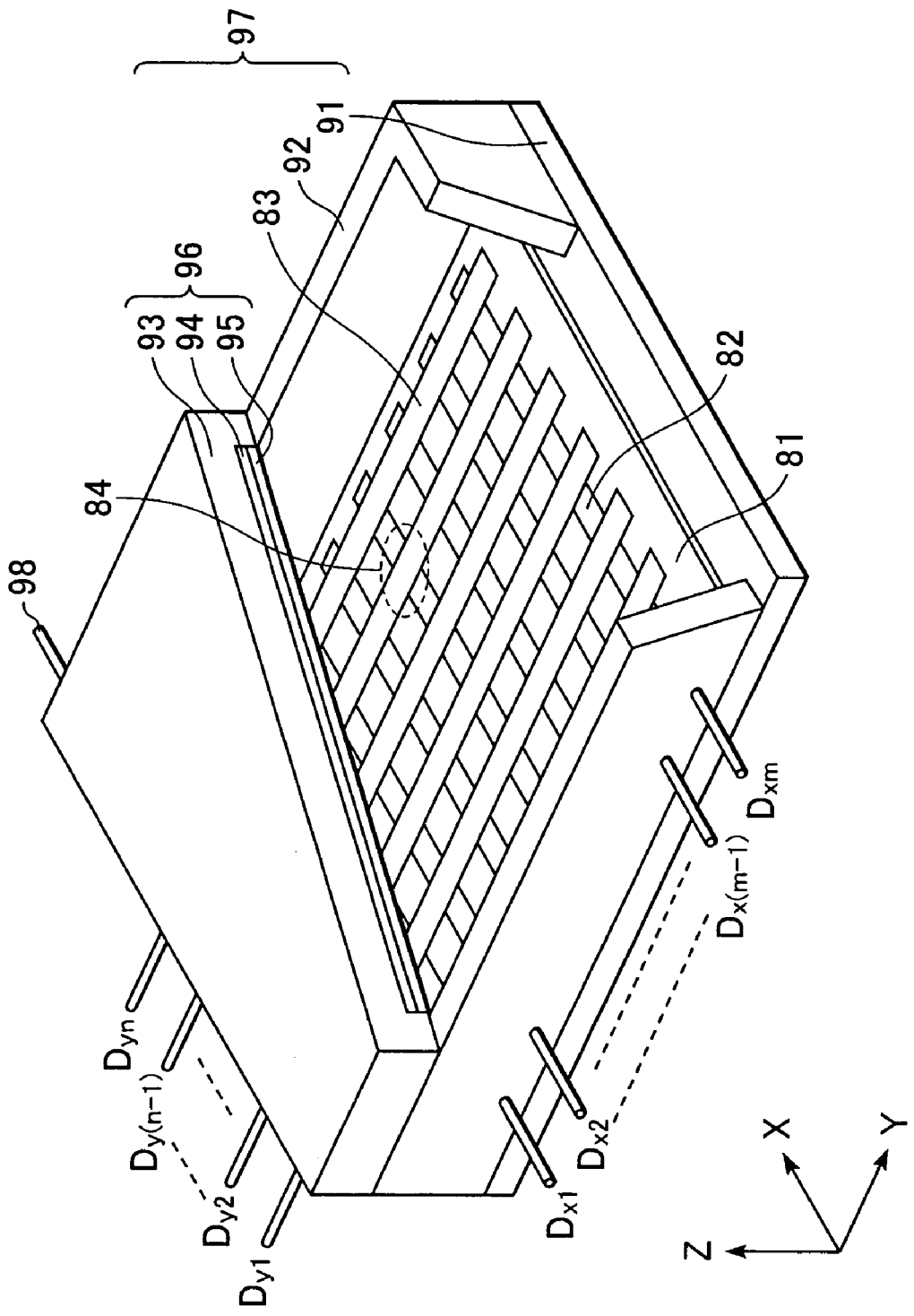

PRIOR ART

ELECTRON EMISSION DEVICE, ELECTRON SOURCE, AND IMAGE DISPLAY HAVING DIPOLE LAYER

BACKGROUND OF THE INVENTION

1. Field of the Invention

The present invention relates to a field emission type electron emission device using an electron emission film, an electron source having a number of the electron emission devices, and an image display constructed using the electron source.

2. Description of the Related Art

The electron emission device includes a field emission type (referred to as an FE type below) and a surface conduction type electron emission device.

The FE type electron emission device is a device for extracting electrons into a vacuum from a cathode electrode (or the electron emission film) by applying a voltage (electric field) between the cathode electrode (and the electron emission film disposed thereon) and a gate electrode. Therefore, the operating electric field is largely affected by the work function and the shape of the cathode electrode (the electron emission film), and in general, the cathode electrode (the electron emission film) with a small work function may be necessary to be selected.

Japanese Patent Laid-Open No. 9-199001 discloses an electron emission device having a metal as the cathode electrode and a semiconductor (diamond, AlN, BN, etc.) bonded to the metal. In that Japanese Patent, a method is disclosed in which the semiconductor film surface of diamond with a thickness of about 10 nm or less is terminated with hydrogen so as to make negative on electron affinity of the semiconductor film. FIG. 14 is a band diagram showing the electron emission principle of the electron emission device disclosed in Japanese Patent Laid-Open No. 9-199001. In the drawing, reference numeral 1 denotes the cathode electrode, numeral 141 the semiconductor film, numeral 3 an extraction electrode, numeral 4 a vacuum barrier, and numeral 6 an electron.

Diamond having a surface terminated with hydrogen is typical as a material having a negative electron affinity. An electron emission device using a diamond surface as an electron emission surface is disclosed in U.S. Pat. No. 5,283,501, U.S. Pat. No. 5,180,951, Zhinov. J. Liu et al, "Environmental Effect On the electron emission from diamond surfaces", and J. Vac. Sci. Technol, B16(3), May/June, 1998, PP. 1188–1193.

SUMMARY OF THE INVENTION

In the conventional electron emission device using diamond mentioned above, electron emission at a low threshold electric field and a large current emission are enabled. On the other hand, when a semiconductor having a negative electron affinity or an extremely small positive electron affinity is used, if the semiconductor is once injected with an electron, the electron is almost certainly emitted. Therefore, the characteristics readily emitting electrons may disable the control (on/off switching, in particular) of the electron emission from each electron emission device applied to an electron source or a display device.

In general, in an electron source having FE type electron emission devices arranged in a matrix form (matrix pattern) and a display (FED) using the electron source, each electron emission device is connected to one of a plurality of pieces of wiring in the X-direction (scanning wiring to be applied by a scanning signal) and to one of a plurality of pieces of wiring in the Y-direction (signal wiring to be applied by a modulation signal). In the case of so-called "line-by-line driving", a desired one piece of the wiring in the X-direction is selected from a plurality of pieces of wiring in the X-direction so as to apply a scanning signal thereto while a modulation signal is applied to the wiring in the Y-direction connected to a desired electron emission device connected to the wiring in the X-direction selected in conjunction with the scanning signal. By performing this operation sequentially on another piece of the wiring in the X-direction, the "line-by-line driving" is carried out. The "line-by-line driving" is not limited to driving one line at a time, and a plurality of lines (a plurality of wirings in the X-direction) may be simultaneously driven. In other words, the scanning signal may be applied, at the same time, to two or more wirings in the X-direction.

In the "line-by-line driving", an electron emission device applied by a voltage other than 0 V (typically, half of the drive voltage applied to the selected electron emission device) may exist in non-selected electron emission devices (electron emission devices connected to the non-selected scanning wiring). A state in which a voltage lower than the drive voltage during selection (and other than 0 V) is applied to a non-selected electron emission device is called as a "half-selected" state. The voltage applied to the electron emission device in the "half-selected" state is called a "half-selected voltage". Also, current emitted from the electron emission device in the "half-selected" state and/or the current flowing through the electron emission device in the "half-selected" state are called as a "half-selected current". The current emitted from the selected electron emission device and/or the current flowing through the electron emission device in the selected state are each called a "selected current", and a ratio of the "half-selected current" and the "selected current" is referred to as a "half-selected current ratio".

When the "line-by-line driving" method is applied to an electron source or a display including a plurality of electron emission devices using a semiconductor having a negative electron affinity or an extremely small positive electron affinity arranged in the matrix form, the above-mentioned "half-selected current" is liable to arise. This can degrade displayed images or the contrast of images.

Next, the "half-selected current" regarding the contrast will be described. A field emission current J conforming to the Fowler-Nordheim model is expressed as follows:

[Numerical Formula 1] (1)

$$J = \frac{AE^2}{\phi t} \exp\left(-B\frac{\phi^{1.5}}{E}v\right) \approx \frac{A(V\beta)^2}{\phi t} \exp\left(-B\frac{\phi^{1.5}}{V\beta}\right)$$

where A, B: constant, $\phi$: height of barrier (corresponding to electron affinity), V: applied voltage, and $\beta$: electric field enhancement factor. Therefore, the half-selected current $J_{half}$ is:

[Numerical Formula 2] (2)

$$J_{half} \approx \frac{A(V\beta)^2}{4\phi t} \exp\left(-B\frac{2\phi^{1.5}}{V\beta}\right)$$

Therefore, the half-selected current ratio is expressed as:

[Numerical Formula 3] (3)

$$\frac{J_{half}}{J} \approx \frac{\frac{A(V\beta)^2}{4\phi t}\exp\left(-B\frac{2\phi^{1.5}}{V\beta}\right)}{\frac{A(V\beta)^2}{\phi t}\exp\left(-B\frac{\phi^{1.5}}{V\beta}\right)} = \frac{1}{4}\exp\left(-B\frac{\phi^{1.5}}{V\beta}\right)$$

The above-mentioned "half-selected current ratio" corresponds to the contrast between a display section (light emitting section) for performing the display and a non-display section (non-light-emitting section). For example, it is important for the display to have a contrast ratio of 1/1000. In achieving the contrast ratio=1/1000, if the entire electrons field-emitted from the cathode electrode (or the electron emission film) are assumed to contribute to the light emission of a light-emitting member, the "half-selected current ratio" is given by:

[Numerical Formula 4] (4)

$$\frac{1}{1000} > \frac{1}{4}\exp\left(-B\frac{\phi}{V\beta}\right)$$

The equation (4) can be written as:

$$B\frac{\phi}{V\beta} > 5.5 \qquad (5)$$

As is apparent from the equation (5), in order to have a contrast ratio=1/1000, values of V and β are preferably smaller and φ is larger. Also, when a material having a negative electron affinity is used, the equation (5) cannot be satisfied so as not to achieve a sufficient or desired contrast in an image display using such an electron emission device. FIG. 15 shows the relationship between Vβ in each φ and $\phi^{1.5}/V\beta$.

The case where the entire electrons emitted from the cathode electrode (or the electron emission film) become emission currents has been described. However, in the "half-selected" state, even when some (or the entire) of the emitted electrons flow to the gate electrode, not only is the electric power consumption of the device itself increased, but also the so-called "line-by-line driving" cannot be substantially carried out.

Problems produced when the electron emission device is driven in a matrix arrangement have been described here. There also can be other problems in the electron emission device using a semiconductor having a negative electron affinity or an extremely small positive electron affinity. That is, since the electron emission device mentioned above has an extremely small threshold electric field, in the case where the anode electrode and the electron emission device are arranged so as to oppose each other, as in an image display, the electron emission device is always exposed to a high electric field due to the anode electrode. Therefore, if the anode electrode and the electron emission device are simply arranged so as to oppose each other, even when the applying voltage to the electron emission device is 0 volt (non-selected state), electrons may be easily emitted by the electric field due to the anode electrode. As a result, in the same way as the problems in the above-mentioned "line-by-line driving", a problem of the on/off contrast arises so that the function of the image display may be disabled.

It is an object of the present invention to provide an electron emission device having desired and sufficient on/off characteristics and being capable of efficiently emitting electrons with a low voltage, an electron source using the electron emission device, and furthermore an image display with a high contrast, each of which overcomes the problems described above.

An electron-emitting device according to the present invention includes:

(A) a cathode electrode;
(B) an insulation layer covering at least part of a surface of the cathode electrode and having a dipole layer formed on its surface (or having a surface including a dipole layer); and
(C) an extraction electrode,
wherein an electron emission to vacuum, by quantum-mechanical tunneling through the insulation layer and a vacuum barrier by applying a voltage between the cathode electrode and the extraction electrode, takes place in a condition where the vacuum barrier in contact with the dipole layer is higher than a conduction band on the surface of the insulation layer.

An electron source of the invention includes a plurality of electron emission devices according to the present invention, and an image display includes the electron source according to the present invention and a luminous body (light-emitting member).

An electron emission device according to the present invention may preferably further include at least one of the following features:

a thickness of the insulation layer is 10 nm or less;
the dipole layer is formed by terminating the surface of the insulation layer with hydrogen;
the surface of the insulation layer has a positive electron affinity during the electron emission;
the insulation layer contains carbon as a principal ingredient, and preferably the carbon includes an $sp^3$ hybrid orbital structure carbon as a principal ingredient;
a Root-Mean-Square (RMS) surface roughness of the insulation layer is smaller than one tenth of a film thickness of the insulation layer;
the RMS surface roughness of the cathode electrode is smaller than one tenth of the film thickness of the insulation layer;
the RMS surface roughness of the cathode electrode is 1 nm or less;
the extraction electrode and the cathode electrode are separated by a spatial interval, on a substrate upon which they are arranged;
more preferably, a surface of the substrate is exposed through a gap formed between the cathode electrode and the extraction electrode, and also is provided with a recess;
at least part of the insulation layer is arranged on a surface of the cathode electrode opposing the extraction electrode;
an end of the insulation layer is not in contact with the surface of the substrate or the end of the insulation layer is spaced from and does not cover at least part of a surface of the cathode electrode opposing the extraction electrode; and
the extraction electrode is disposed above the cathode electrode and has an opening for passing an electron therethrough, and the insulation layer also has an opening (exposing the cathode electrode) disposed at a position corresponding to the opening of the extraction electrode.

As described above, an electron emission device according to the present invention preferably is a field emission type electron emission device capable of efficiently emitting electrons with a low voltage and good on/off characteristics. A display with a high contrast can be achieved using this device.

Further objects, features and advantages of the present invention will become apparent from the following description of the preferred embodiments with reference to the attached drawings.

BRIEF DESCRIPTION OF THE DRAWINGS

FIG. 2, consisting of FIGS. 2A and 2B, is a partially enlarged schematic view of the electron emission device according to the present invention.

FIG. 9 is a schematic structural drawing showing an example of an image display according to the present invention.

DESCRIPTION OF THE PREFERRED EMBODIMENTS

Figure 1A:
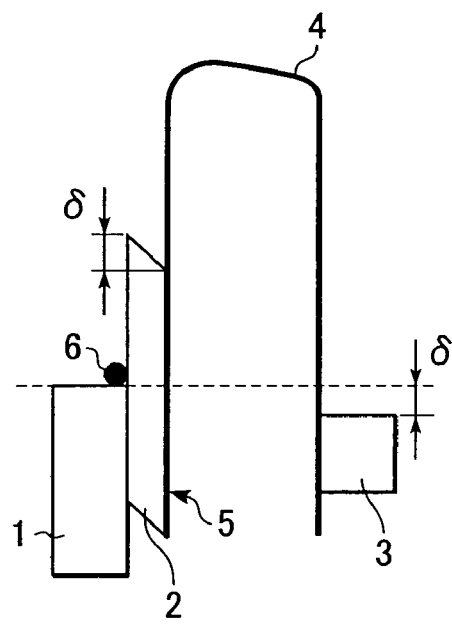
FIG. 1, consisting of FIGS. 1A and 1B, is a band diagram for illustrating an electron emitting principle of an electron emission device according to the present invention.

An object of the present invention is to improve the controllability of an electron emission device having a low threshold electric field (an electric field needed for starting electron emission) while making use of its excellent electron emission characteristics when a plurality of the electron emission devices are arranged on a substrate so as to selectively drive them by a method such as a matrix driving (such as "line-by-line driving"). Specifically, it is an object of the present invention to provide an electron emission device for taking out an electron from an electron emission material into a vacuum using a quantum tunneling phenomenon of a carrier (electron) through an insulating layer and a tunneling phenomenon of a vacuum barrier reduced by terminating the electron emission material with hydrogen.

An electron emission device according to the present invention, as its basic structure, is composed of (A) a cathode electrode, (B) an insulating layer covering at least part of a surface of the cathode electrode and having a dipole layer formed on its surface, and (C) an extraction electrode (a gate electrode and/or an anode electrode).

Preferred embodiments according to the present invention will be described below in detail with reference to the drawings. The scope of the present invention is not limited to the sizes, materials, shapes, and relative arrangements of the structural components described in these embodiments.

The electron emission principle of the electron emission device according to the present invention will be described with reference to FIGS. 1A and 1B. In these drawings, reference numeral 1 denotes a cathode electrode; numeral 2 an insulation layer; numeral 3 an extraction electrode; numeral 4 a vacuum barrier; numeral 5 an interface between the insulation layer 2 having a dipole layer 20 formed thereon and a vacuum; and numeral 6 an electron.

The drive voltage for extracting (drawing) the electron 6 from the cathode electrode 1 to the vacuum is a voltage between the cathode electrode 1 and the extraction electrode 3 in a condition that a potential higher than a potential of the cathode electrode 1 is applied to the extraction electrode 3.

Figure 1B:
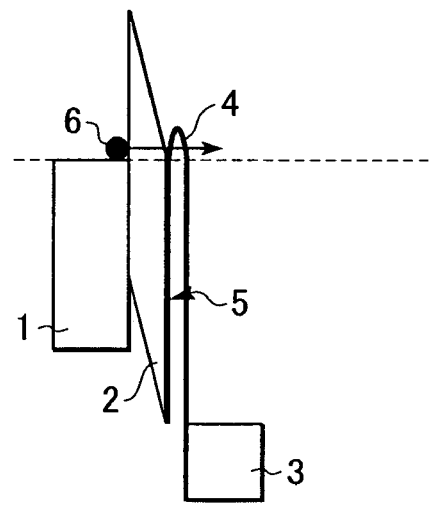

FIG. 1A is a band diagram showing a state in which the drive voltage of the electron emission device according to the present invention is 0 [V] (i.e., where the cathode electrode potential and extraction electrode potential are substantially same). FIG. 1B is a band diagram showing a state where the drive voltage (>0[V]) is applied between the cathode electrode 1 and the extraction electrode 3. Referring to FIG. 1A, the insulation layer 2 is being polarized by a dipole layer formed on the surface of the insulation layer 2, so that a state, equivalent to a condition where a voltage of δ [V] is applied to the surface of the insulation layer 2, is formed. When a voltage V (V) is applied further in this state, the band of the insulation layer 2 is bent more steeply while the vacuum barrier 4 is bent more steeply. In this state, the vacuum barrier 4 being in contact with the dipole layer is higher than the conduction band on the surface of the insulation layer 2 (see FIG. 1B). In other words, in this state, a level (height) of the vacuum barrier 4 being in contact with the dipole layer is higher than that of the conduction band on the surface of the insulation layer 2. In this state, the electron 6 injected from the cathode electrode 1 can be emitted into the vacuum by tunneling (quantum-mechanical tunneling) through the insulation layer 2 and the vacuum barrier 4. The drive voltage of the electron emission device (the voltage applied between the cathode electrode 1 and the extraction electrode 3 in a driving condition) according to the present invention is preferably 50 V or less, and more preferably between 5 and 50 V.

The state shown in FIG. 1A will now be described with reference to FIG. 2. In FIG. 2, reference numeral 20 denotes a dipole layer, numeral 21 a carbon atom, and numeral 22 a hydrogen atom. The dipole layer 20 is formed at the surface (an interface to the vacuum) of the insulation layer 2 terminated with the hydrogen 22, in this example. However, the terminating material of the present invention is not limited to hydrogen 22. Also, a carbon layer is exemplified as the insulation layer 2. Although a material of the insulation layer 2 according to the present invention is not limited to carbon, in view of electron emission characteristics and facility in manufacturing, it is preferable to have a carbon layer as the material of the insulation layer 2. The material for terminating the surface of the insulation layer 2 may be any one as long as it reduces a surface level(surface potential) of the insulation layer 2 in a state that a voltage is not applied to between the cathode electrode 1 and the extraction electrode 3. But, preferably, the hydrogen is used. Also, it is preferable that, in a state where a voltage is not applied between the cathode electrode 1 and the extraction electrode 3, the material for terminating the surface of the insulation layer 2 decreases the surface level (potential) of the insulation layer 2 by 0.5 eV or more, and more preferably by 1 eV or more. However, in the electron emission device according to the present invention, the electron affinity of the surface of the insulation layer 2 is required to show positive electron affinity in both states that a voltage is applied and a voltage is not applied between the cathode electrode 1 and extraction electrode 3. A voltage applied to the anode electrode 33 is generally about over ten kV to 30 kV. Then, an electric field intensity generated between the anode electrode and the electron emission device is generally assumed to be about $1 \times 10^5$ V/cm or less. Therefore, it is preferable that electrons not be emitted from the electron emission device because of the electric field intensity. Accordingly, an electron affinity on the surface of the insulation layer 2 having the dipole layer 20 formed thereon may preferably be 2.5 eV or more, considering the film thickness of the insulation layer 2 which will be described later.

The film thickness of the insulation layer 2 may be determined by the drive voltage, and preferably is set at 20 nm or less, and more preferably at 10 nm or less. The lower film thickness limit of the insulation layer 2 may be set to any thickness as long as if enables a barrier (the insulation layer 2 and a vacuum barrier) to be formed for tunneling an electron 6 supplied from the cathode electrode 1; instead, in view of film reproduction, it is preferably set at 1 nm or more.

In this manner, in the electron emission device according to the present invention, the insulation layer 2 has a positive electron affinity at any state, so that a distinct on-off ratio of an electron emission amount(i.e., a distinct difference of an electron emission amount between the selected state and the non-selected state) can be achieved.

FIG. 2 shows an example of the dipole layer 20 formed at the surface (an interface to the vacuum) of the insulation layer 2 terminated with the hydrogen 22. Preferably, the hydrogen 22 is positively polarized (δ+) slightly. Thereby, atoms (carbon atoms 21, in this case) on the surface of the insulation layer 2 are negatively polarized (δ−) slightly to form the dipole layer (also referred to as "an electric double layer") 20.

Therefore, as shown in FIG. 1A, in the electron emission device according to the present invention, even though the drive voltage is not applied between the cathode electrode 1 and the extraction electrode 3, a state equivalent to a state where a potential δ(V) of the electric double layer is applied is formed on the surface of the insulation layer 2. Also, as shown in FIG. 1B, by the application of the drive voltage V(V) between the cathode electrode 1 and the extraction electrode 3, the level (potential) reduction in the surface of the insulation layer 2 progresses while the vacuum barrier 4 is also lowered in conjunction therewith. According to the present invention, the film thickness of the insulation layer 2 is appropriately set so that an electron can quantum-mechanically tunnel the insulation layer 2 in response to the drive voltage V (V); for example, in view of the load of the drive circuit, 10 nm or less is preferable. When the film thickness becomes about 10 nm, the spatial distance of the insulation layer 2, through which the electron 6 supplied from the cathode electrode 1 tunnels by application of the drive voltage V (V), is also reduced, resulting in a possible state of tunneling.

As described above, the vacuum barrier 4 is also lowered in conjunction with application of the drive voltage V(V) while the spatial distance of the vacuum barrier 4 is reduced in the same way as that of the insulation layer 2, so that the vacuum barrier 4 can also be tunneled through, achieving the electron emission to the vacuum.

Various modifications may be made in the electron emission device according to the present invention. Such modifications are shown in FIGS. 3 to 6. In the drawings, reference numeral 31 denotes a substrate and numeral 32 a gate electrode as an extraction electrode, and like references designate like components common to FIGS. 1A to 2.

As shown in FIGS. 3 to 6, according to the present invention, on a surface of the substrate 31, a gate electrode 32 and the cathode electrode 1 are arranged so that there is an interval there between; the surface of the cathode electrode 1 preferably is covered with the insulation layer 2 having the dipole layer 20; and an anode electrode 33 is further arranged so as to oppose the cathode electrode 1 to form a so-called triode structure.

Referring to FIGS. 3 to 6, a voltage Vg is applied between the gate electrode 32 and the cathode electrode 1, and a voltage Va is applied between the cathode electrode 1 and the anode electrode 33 and is higher than the voltage Vg.

In the configurations shown in FIGS. 3 to 6, when the voltages Vg (V) and Va (V) are applied for driving the electron emission devices, a strong electric field is applied to the insulation layer 2 on the cathode electrode 1 and the shape of an equipotential surface is determined by the voltage Vg (V), the thickness and shape of the insulation layer 2, and a dielectric constant of the insulation layer 2. The equipotential surfaces periphery (out of the interspace region between the cathode electrode 1 and the gate electrode 32) of the insulation layer 2 becomes substantially parallel to the anode electrode surface, although in dependence on the distance between the anode electrode 33 and the cathode electrode 1.

When an electric field applied to the insulation layer 2 (which is an electron emission film) exceeds a predetermined threshold value, an electron emission takes place from the insulation layer 2. At this time, the emitted electron is accelerated toward the anode electrode 33 so as to impinge upon a fluorescent material (not shown) disposed on a lower surface of the anode electrode 33, to cause the material to emit light.

Figure 3:
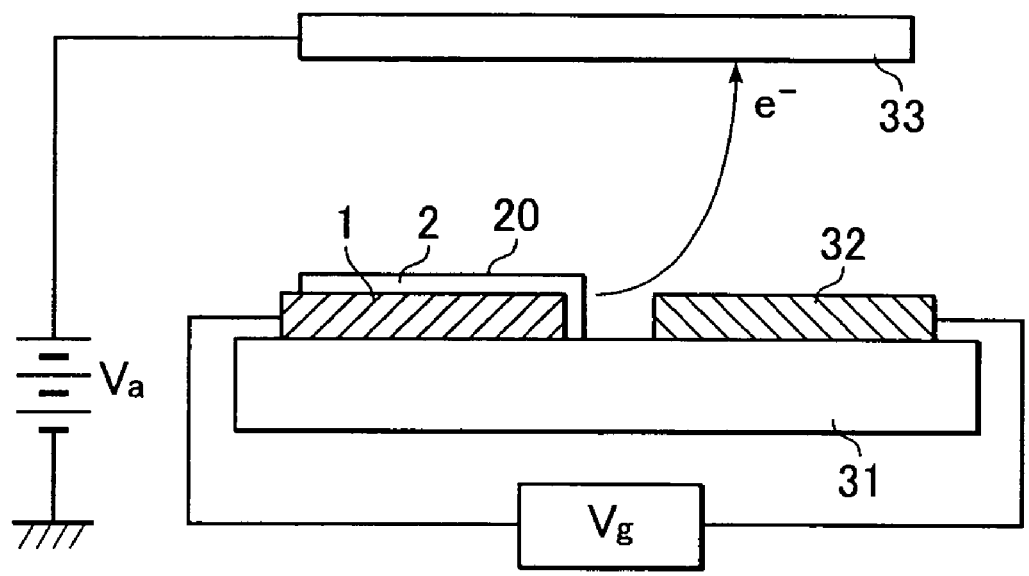
FIG. 3 is a sectional schematic view of an example of the electron emission device according to the present invention.
Figure 4:
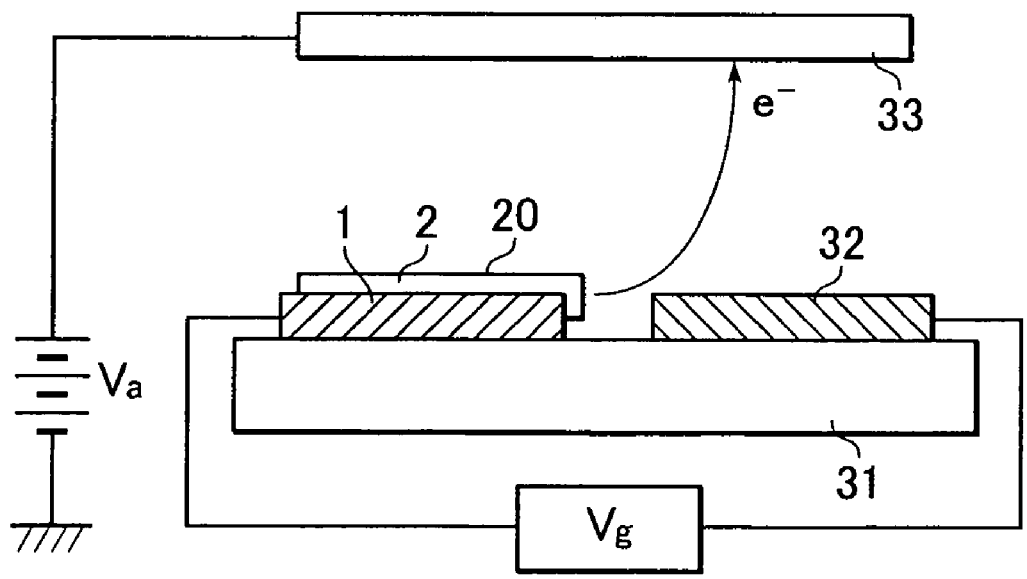
FIG. 4 is a sectional schematic view of an example of the electron emission device according to the present invention.
Figure 5:
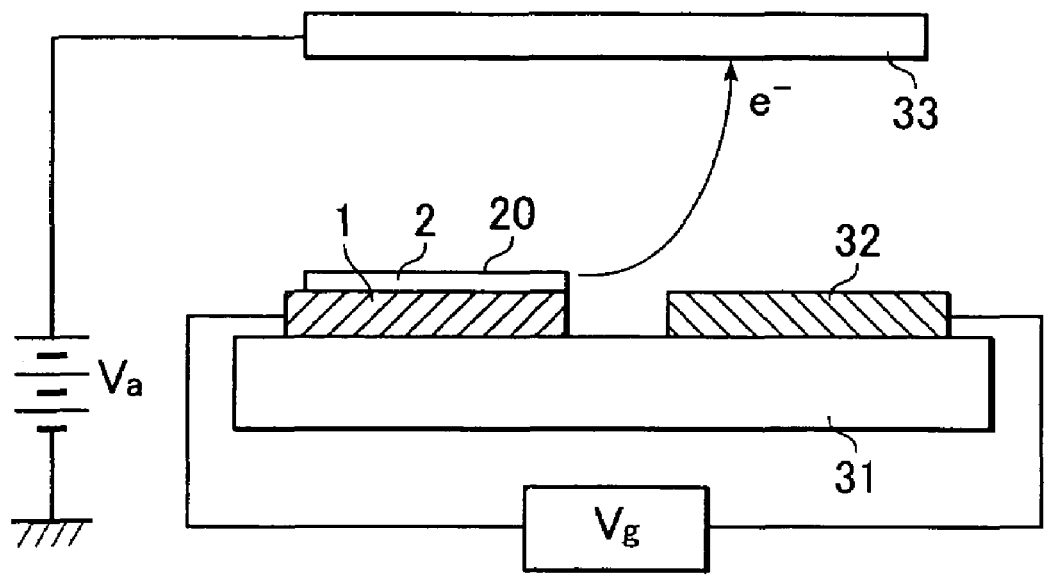
FIG. 5 is a sectional schematic view of an example of the electron emission device according to the present invention.
Figure 6:
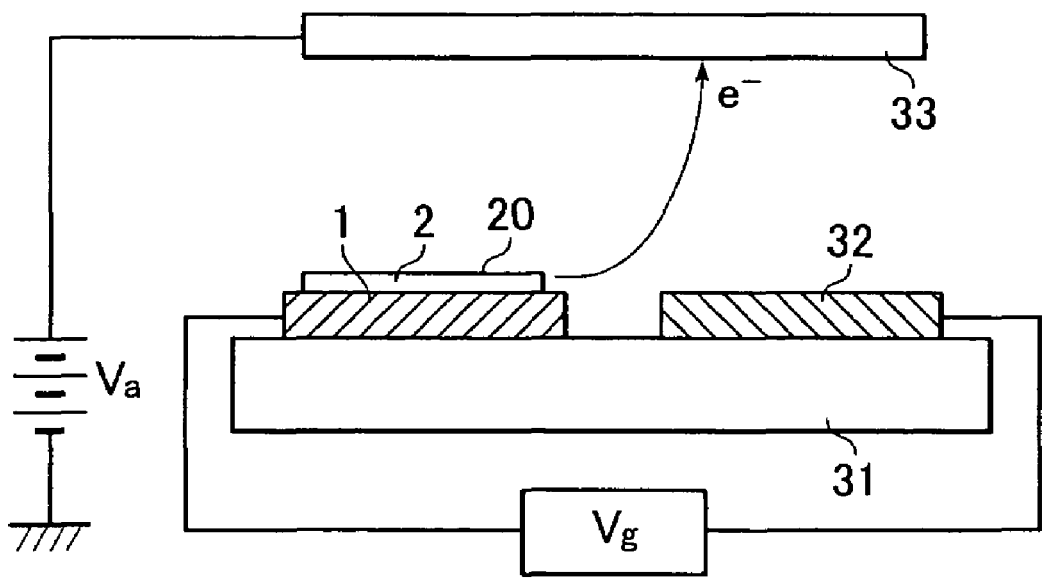
FIG. 6 is a sectional schematic view of an example of the electron emission device according to the present invention.

FIG. 3 shows that the insulation layer 2 having the dipole layer 20 mentioned above substantially covers the entire surface of the cathode electrode 1, and FIG. 4 shows that the insulation layer 2 is not in contact with the substrate 31 adjacent a side (side face) of electrode opposing and facing the gate electrode 32, so that part of a lower portion of the side of the cathode electrode 1 is exposed. FIG. 5 shows that the insulation layer 2 is arranged only on a top surface (the surface opposing the anode electrode 33 or the surface substantially parallel to the substrate 1) of the cathode electrode 1, and FIG. 6 shows that an end of the insulation layer 2 facing electrode 32 is retracted from an end (edge) of the surface of electrode 1 opposing the gate electrode 32, so that part of an upper surface (edge surface) of the cathode electrode 1 is exposed. In view of the efficiency (the ratio of electrons arriving at the anode electrode 33 to the total amount of electrons emitted from the cathode electrode 1) of the electron emission, the states have an excellent tendency on the order of FIG. 3<FIG. 4<FIG. 5<FIG. 6. In the state shown in FIG. 6, since the uniformity of the electric field applied to the insulation layer 2 is high, the uniformity of the emission current density distribution may be more increased.

The examples mentioned above have a triode structure; however, alternatively, in other embodiments they may have a so-called diode structure by eliminating the gate electrode 32 from the configurations shown in FIGS. 3 to 6. In this case, the anode electrode becomes an extraction electrode. In FIGS. 3 to 6, the gate electrode 32 and the cathode electrode 1 are arranged on the same substrate; alternatively, in other embodiments a configuration such as a so-called spinto-type may also be adopted in which the gate electrode 32 is arranged between the cathode electrode 1 and the anode electrode 33, and above the cathode electrode 1. In such a configuration, generally, an insulating layer (not shown) is disposed between the cathode electrode 1 and the gate electrode for electrical insulation. In this case, it is preferable that an opening, namely a so-called "gate hole", through which an electron can pass, be formed. The opening is preferably provided in the insulating layer and the gate electrode so that the cathode electrode 1 is exposed to the opening, and the opening of the insulating layer is arranged by corresponding (communicating) it positionally to the opening of the gate electrode.

Also, in the triode structure, by a composite electric field generated by both the gate electrode 32 and the anode electrode 33, an electron can be emitted from the cathode electrode 1 (the insulation layer 2). In such a case, the gate electrode 32 and the anode electrode 33 constitute the extraction electrode.

The electron emission device according to the present invention typically can emit an electron by applying an electric field with less than $1 \times 10^6$ V/cm between the surface of the insulation layer 20 and the extraction electrode. Since the insulation layer 20 is very small in thickness, the electron emission device according to the present invention effectively can emit an electron by applying an electric field with less than $1 \times 10^6$ V/cm between the cathode electrode and the extraction electrode.

According to the present invention, it is preferable that the cathode electrode 1 have a flat shape as shown in FIGS. 3 to 6; However, in order to increase the electric field, the cathode electrode 1 in other embodiments may have a protruding shape such as a conical shape and so on. However, since the protruding shape has a high tendency to locally concentrate an electric field in excess, in the case where a number of electron emission devices are formed in a high density on a large area as in a display, for example, the uniformity may be adversely reduced. Therefore, the surface shape of the cathode electrode (the surface of the insulation layer 2) in such a case is preferably flat. More specifically, the surface roughness of the cathode electrode 1 and/or the insulation layer 2 preferably is smaller than one tenth of the film thickness of the insulation layer by a Root-Mean-Square (RMS) notation system. Furthermore, it is preferable that the RMS surface roughness of the cathode electrode 1 and/or the insulation layer 2 be 1 nm or less. The RMS is used in, for example, Japanese Industrial Standard, and expresses the deviation between an average curve and a measured curve by a root-mean-square.

Next, an example of a manufacturing method of the electron emission device according to the present invention will be described with reference to FIGS. 7A to 7E. The manufacturing method of the illustrated embodiment is an example, and the present invention, broadly construed, is not limited only to the specific details of this embodiment. The depositing order and the etching method depend on the types of structures employed, as will be additionally described in the below Embodiments.

[Process 1]

Any one of quartz glass, glass with reduced impurities such as Na, soda lime glass, a composite having $SiO_2$ deposited on a substrate, and an insulating substrate made of ceramics, which are sufficiently washed on surfaces in advance, is used as a substrate 31, and on the substrate 31, an electrode layer 71 is deposited.

The electrode layer 71 generally having conductivity, is formed by a general film-forming technique such as vacuum deposition and sputtering. The material of the electrode layer 71 may be appropriately selected from one or more metals and alloys such as Be, Mg, Ti, Zr, Hf, V, Nb, Ta, Mo, W, Al, Cu, Ni, Cr, Au, Pt, and Pd. The thickness of the electrode layer 71 is set in the several tens of nanometers (nm) to several hundreds of micrometers (μm), and preferably is set in the 100 nm to 10 μm range.

[Process 2]

Figure 7A:
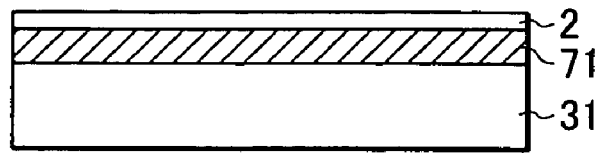
FIG. 7, consisting of FIGS. 7A to 7E, is a sectional schematic view of an example representing a manufacturing method of an electron emission device according to the present invention.

As shown in FIG. 7A, the insulation layer 2 is deposited on the electrode layer 71. The insulating layer 2 is formed by a general film-forming technique such as vacuum deposition, sputtering, an HFCVD (Hot Filament CVD) method, and a plasma CVD method; however, the method is not limited to this. The thickness of the insulation layer 2 is set in the range capable of making an electron tunnel, and preferably in the 4 nm to 10 nm range.

The material of the insulation layer 2 may be fundamentally any suitable insulating material. A material with a dielectric constant as small as possible is preferable if only the electric field concentration is taken into consideration. The material may preferably have a resistivity ranging from $1 \times 10^8$ to $1 \times 10^{14}$ Ωcm. The material may preferably use carbon if it is regarded as the electron emission material. As described above, the insulation layer 2 preferably has a high resistance so as to substantially function as an insulator. Accordingly, the insulation layer 2 may mainly contain amorphous carbon, diamond-like carbon (DLC), nitrides of a metal, oxides of a metal, and carbides of a metal, and it is especially preferable that the layer 2 contains $sp^3$ hybrid orbital structure carbon as a principal ingredient.

[Process 3]

Figure 7B:
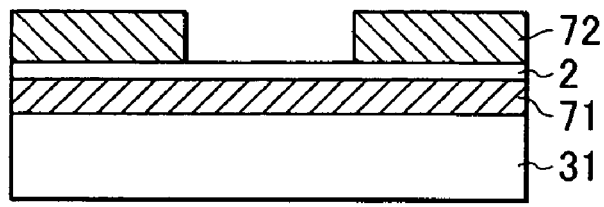

In order to divide the electrode layer 71 into the cathode electrode 1 and the gate electrode 32 by photolithography, a photoresist 72 is patterned (FIG. 7B).

[Process 4]

Figure 7C:
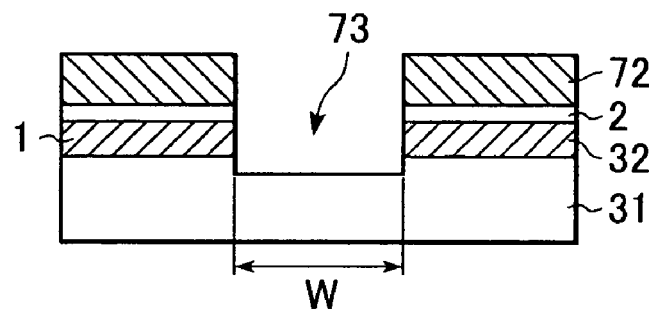

By etching, dividing of the electrode layer 71 into the cathode electrode 1 and the gate electrode 32 as shown in FIG. 7C is effected. Regarding the etched surfaces of the electrode layer 71 and the insulation layer 2, a smooth and vertical inner surface or a smooth and tapered surface is desirable and preferably obtained through the etching process, and an appropriate etching method, a dry or wet method, may be selected depending on the types of materials employed. The width W of an opening (depressed portion) 73 is generally and appropriately set based on the kind and electrical resistivity of materials constituting the electron emission device, the work function and drive voltage of the material of the electron emission device, and the shape of the required electron emission beam. The width W between the gate electrode 32 and the cathode electrode 1 preferably is set to a value ranging from several hundred nm to 100 μm.

The surface of the substrate 31 exposed to the opening 73 between the cathode electrode 1 and the gate electrode 32 preferably is lower than the boundary between the electrode 1 and the substrate 31 (may be preferably excavated), as shown in FIG. 7C. In such a manner, by concavely shaping the surface of the substrate 1 between the cathode electrode 1 and the gate electrode 32 (to form concavity), the electrical pathway distance between the cathode electrode 1 and the gate electrode 32 is effectively increased when the electron emission device is driven and the leakage current between the cathode electrode 1 and the gate electrode 32 is reduced.

[Process 5]

Figure 7D:

As shown in FIG. 7D, the photoresist 72 is then removed.

[Process 6]

Figure 7E:
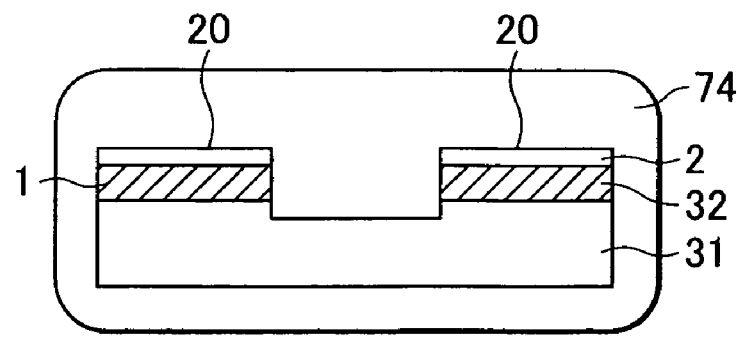

Finally, the surface of the insulation layer 2 is terminated with hydrogen by heat-treated chemical modification to form the dipole layer 20 (FIG. 7E). Reference numeral 74 in FIG. 7E indicates the environment in which this occurs. The heat treatment may also be conducted by heating in an environment containing hydrogen and hydrocarbon gas. The hydrocarbon gas preferably includes a linear hydrocarbon gas such as acetylene gas, ethylene gas, and methane gas.

In the configuration described above and shown in FIG. 7E, the insulation layer 2 is formed to have dipole layers 20 for each layer 2 portion formed over surfaces of the cathode electrode 1 and the gate electrode 32; however, it is preferable that the portion of the insulation layer 2 disposed only on the cathode electrode 1 have the dipole layer 20.

Figure 16A:
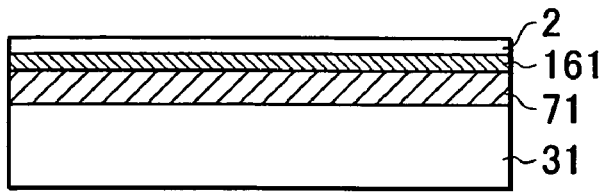
FIG. 16, consisting of FIGS. 16(a) to 16(e), is a sectional schematic view of another example of a manufacturing method of an electron emission device according to the present invention.
Figure 16B:
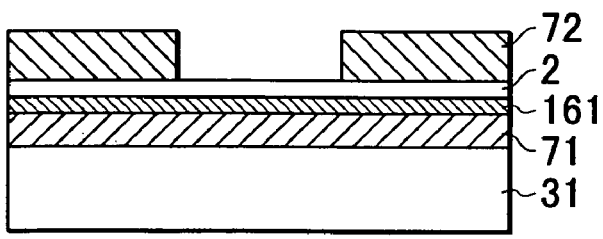
Figure 16C:
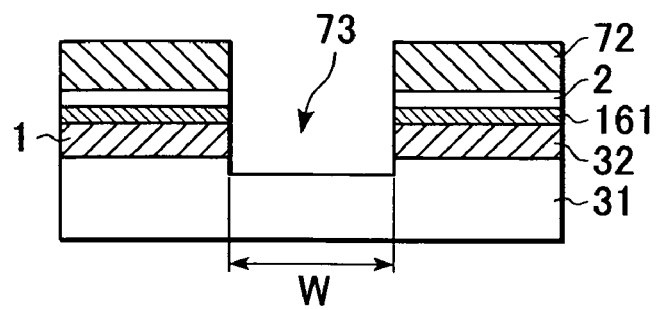
Figure 16D:
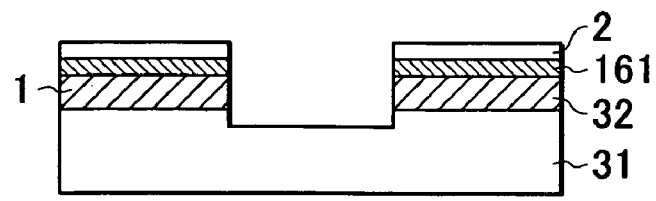
Figure 16E:
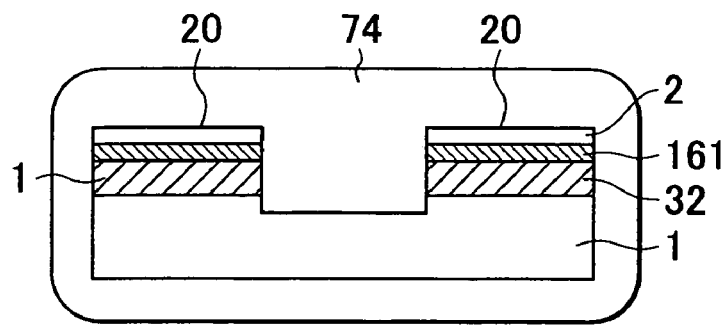
Figure 17A:
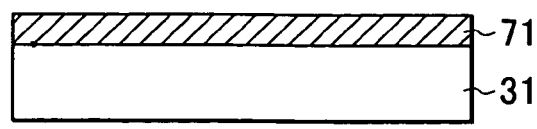
FIG. 17, consisting of FIGS. 17(a) to 17(h), is a sectional schematic view of another example of the manufacturing method of the electron emission device according to the present invention.
Figure 17B:
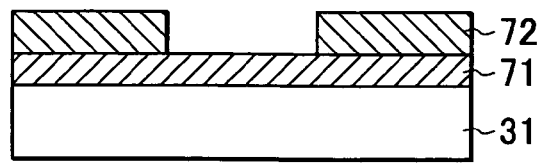
Figure 17C:
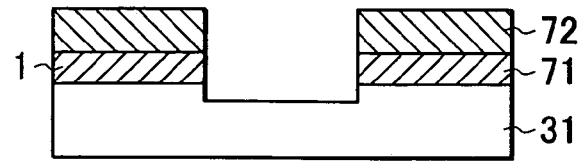
Figure 17D:
Figure 17E:
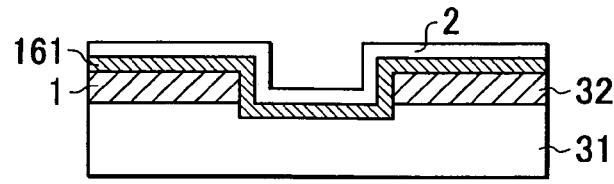
Figure 17F:
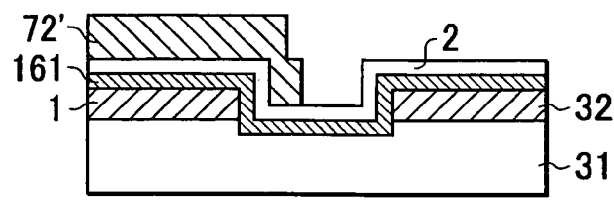
Figure 17G:
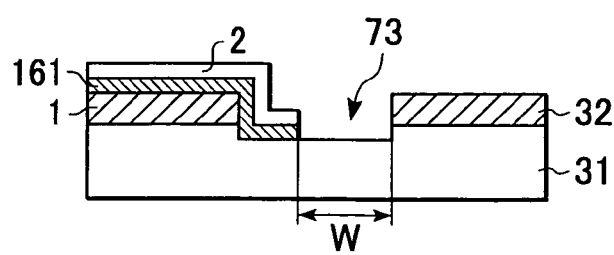
Figure 17H:
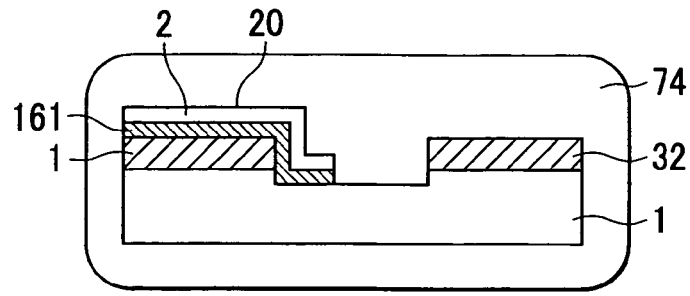

In the electron emission device according to the present invention, as shown in FIG. 16E and FIG. 17H, a resistance layer 161 is arranged between the cathode electrode 1 and the insulation layer 2. By adding the resistance layer 161, the temporal variation of an electric current emitting during the electron emission can be suppressed. The detailed manufacturing method of such a device will be described in an embodiment which will be described below.

The film thickness of the resistance layer 161 ranges from several tens of nanometers (nm) to several millimeters (mm); preferably, it is in a range between several tens of nanometers (nm) and several micrometers (μm). The resistance of the resistance layer 161 with a thickness within the above range preferably is selected from the range between $1 \times 10^5$ Ω and $10^8$ Ω; in practice, from the range between $1 \times 10^6$ Ω and $10^7$ Ω. The material of the resistance layer 161 may includes DLC (diamond like carbon), amorphous carbon, and doped amorphous silicon; however, it is not limited to these materials only.

Next, applications of the electron emission device according to the present invention will be described below. By arranging a plurality of the electron emission device elements (the electrodes and layer 2 with the dipole layer) (for convenience, hereinafter referred to as "electron emission devices"), according to the present invention on a base (substrate), an electron source and an image display can be constructed, for example.

Various arrangements of the electron emission devices may be adopted. As an example, there is a so-called matrix arrangement in that a plurality of the electron emission devices are arranged in plural rows along the X-direction and in plural columns along the Y-direction. One of the respective cathode electrode and gate electrode of each of constituting a plurality of the electron emission devices arranged along a same column is commonly connected to a corresponding wiring in the X-direction while the other of the respective cathode electrode and gate electrode of the electron emission device is connected to a corresponding wiring (in the Y-direction) to which plural electron emission devices in the same column also connected.

Figure 8:
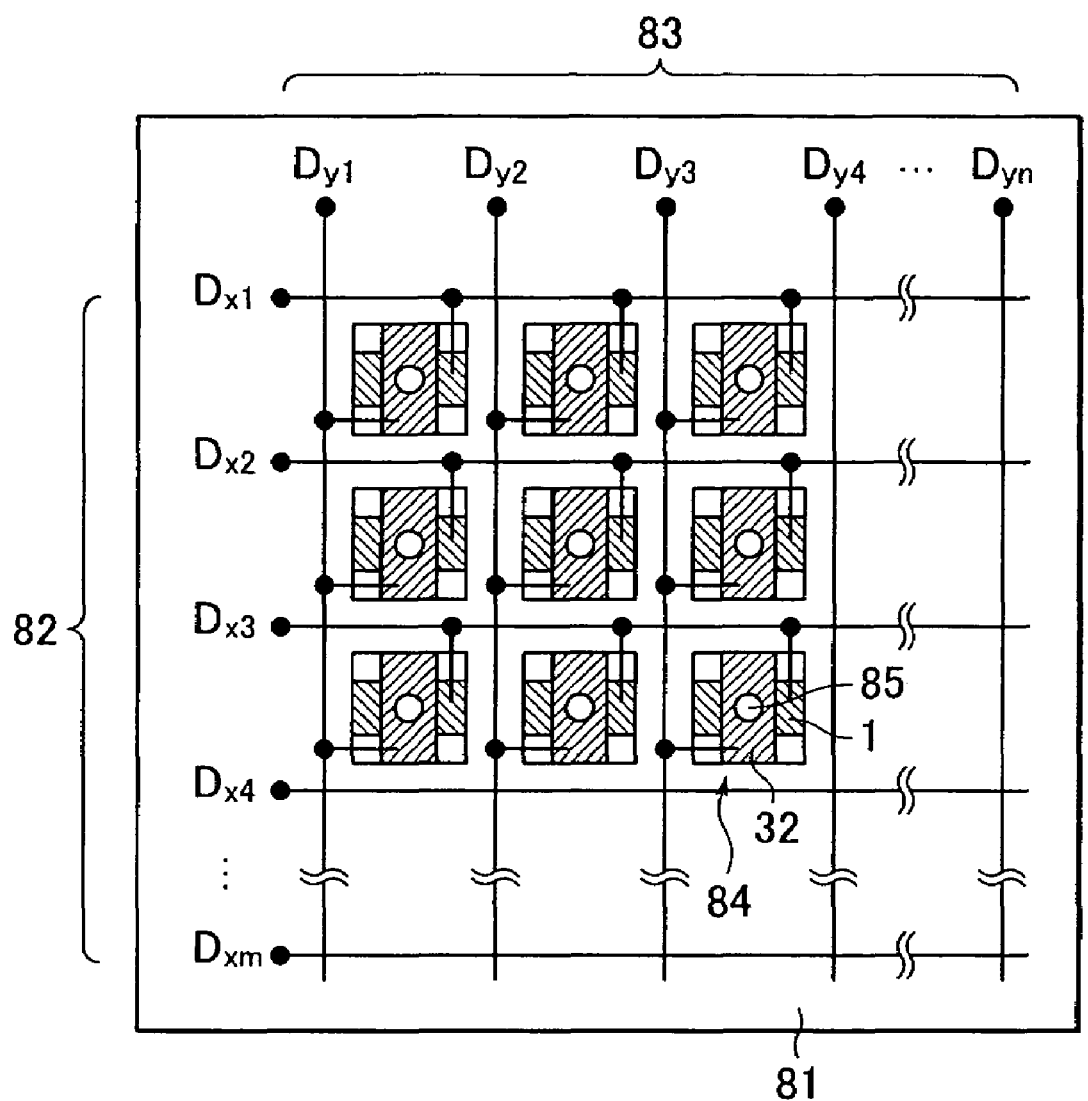
FIG. 8 is a schematic structural drawing showing an example of an electron source according to the present invention.

An electron source according to the present invention with a matrix arrangement obtained by arranging a plurality of the electron emission devices will be described with reference to FIG. 8. Referring FIG. 8, reference numeral 81 denotes an electron source base (substrate); numeral 82 denotes wirings arranged in the X-direction; and numeral 83 denotes wirings arranged in the Y-direction. Reference numeral 84 denotes an electron emission device; and numeral 85 denotes an opening. In the electron emission device 84 in this example, an arrangement is exemplified in that on the cathode electrode 1 having an electron emission film, the gate electrode 32 having an opening 85 is arranged.

M wirings 82 in the X-direction, composed of Dx1 to Dxm, are made of a metal or the like by vacuum deposition, printing and sputtering or the like. The material, the film thickness, and the width of the wirings are appropriately designed based on predetermined criteria. N wirings 83 in the Y-direction, composed of Dy1 to Dyn, are made in the same way. Note that, both M and N are positive integers. Between the individual wirings 82 and the individual wirings 83, an interlayer insulating layer (not shown) is provided so as to electrically insulate the wirings 82 from the wirings 83.

The interlayer insulating layer (not shown) is made of $SiO_2$ or the like formed by vacuum deposition, printing, and sputtering or the like. Part of (i.e., an end of) the wirings 82 and the wirings 83 is used as external terminals.

Electrodes (i.e., the cathode electrode 1 and the gate electrode 32) constituting each electron emission device 84 are electrically connected to a corresponding wiring 82 and a corresponding wiring 83.

The material for making the wirings 82 and the wirings 83 and the material for making the cathode electrode 1 and the gate electrode 32 may be identical to or different from each other, in part or in the entirety of the elements constituting the materials. If they are identical, the wirings 82 and the wirings 83 may also be called as the cathode electrode 1 or the gate electrode 32.

To the wirings 82 in the X-direction, a scanning signal applying driver (not shown) is connected for selecting a line of the electron emission devices 84. On the other hand, to the wirings 83 in the Y-direction, a modulation signal generating driver (not shown) is connected for modulating each row of the electron emission devices 84 corresponding to an input signal. The drive voltage applied to each electron emission device is supplied as the voltage difference between the scanning signal and the modulation signal applied to the device. A configuration is exemplified here in that the scanning signal is applied to the gate electrode 32 while the modulation signal is applied to the cathode electrode 1;

inversely, to the gate electrode 32, the modulation signal may be applied while to the cathode electrode 1, the scanning signal may be applied.

In the configuration described above, individual devices are selected so as to enable them to be driven (and consequently emit electrons) using simplified matrix wirings. An image display using an electron source with such a simplified matrix arrangement will be described with reference to FIG. 9. FIG. 9 is a schematic view showing an example of a display panel of the image display. Like reference numerals designate like members in FIG. 9 common to FIG. 8.

Referring to FIG. 9, the electron source base (substrate) 81 has a plurality of the electron emission devices 84 according to the present invention, and is fixed to a rear plate 91; and a face plate 96 has an image forming member composed of a fluorescent screen 94 and a metal back 95 or the like formed on the internal surface of a transparent substrate 93 such as a glass substrate. To a support frame 92, the rear plate 91 and the face plate 96 are bonded by an adhesive such as a frit glass. Consequently, the package (panel envelope) 97 is composed of the face plate 96, the support frame 92 and the rear plate 91.

Since the rear plate 91 is provided for mainly reinforcing the strength of the electron source base 81, in the case where the electron source base 81 itself has a sufficient strength, the separate rear plate 91 may be omitted. That is, by directly sealing the support frame 92 to the electron source base 81, the package 97 may be constructed of the face plate 96, the support frame 92, and the electron source base 81. On the other hand, between the face plate 96 and the rear plate 91, a support (not shown) called a spacer preferably is provided so that the package 97 having a strength sufficient to the atmospheric pressure may also be constructed.

Next, the package (envelope) 97 is sealed after the face plate 96, support frame 92 and the rear plate 91 are bonded. In the sealing process, while the package 97 is heated, the inside of the package 97 is exhausted through an exhaust pipe (not shown) by a vacuum pump, then, the exhaust pipe is sealed off. In order to maintain the pressure of the package 97 after the face plate 96, support frame 92 and the rear plate 91 are bonded, a getter treatment may also be carried out. The getter (not shown) may use an evaporation type such as Ba (barium) and/or a non-evaporation type of getter. Also, a method is exemplified here in that the exhaust pipe is sealed after the face plate 96, support frame 92 and the rear plate 91 are bonded; alternatively, if the bonding is performed in a vacuum chamber, the sealing of the exhaust pipe is not necessarily required, so that the exhaust pipe itself is not necessary.

In the image display constructed using the electron source with a matrix arrangement produced by the above processes, by applying a voltage to each electron emission device via the external terminals Dxl to Dxm and Dyl to Dyn outside the package, an electron can be emitted from a desired electron emission device. Also, by applying a high voltage Va to the metal back 95 or a transparent electrode (not shown) via a high-voltage terminal 98, an electron beam is accelerated. The accelerated electron impinges upon the fluorescent screen 94 so as to cause screen 94 to emit light and form an image.

The image display according to the present invention may also be used in an image display for an optical printer constructed using a photosensitive drum in addition to image displays for television broadcasting, a television meeting system, and a computer and the like.

Also according to the present invention, a data displaying and/or playing apparatus using the package 97 can be constituted. Specifically, the data displaying and/or playing apparatus includes at least the package 97, a receiver for receiving a broadcasting signal such as a television broadcasting signal, and a tuner for tuning on a station from received signals. Then, at least one of image information, alphabetic information, and speech information contained in the tuned signals is produced to the package 97 so as to display and/or reproduce it. Because of this configuration, the data displaying and/or playing apparatus fulfils the function of a television.

In the case where a broadcasting signal is encoded, the data displaying and/or playing apparatus can also include a decoder of course. The speech signal is produced to sound-reproducing means such as a speaker housed in the data displaying and/or playing apparatus so as to reproduce it simultaneously with the image information and the alphabetic information displayed on the package 97.

A method for displaying and/or reproducing the image information or the alphabetic information by outputting it to the package 97 may be as follows:

First, an image signal corresponding to each pixel of the package 97 is produced from the received image information or alphabetic information. Then, the produced image signal is entered to a drive circuit of the package 97. On the basis of the image signal entered in the drive circuit, the image is displayed by controlling a voltage to be applied to an electron emission element within the package 97 from the drive circuit.

EXAMPLES

Examples of the present invention will be described in detail below.

Example 1

According to the manufacturing method shown in FIG. 10, a semiconductor layer (an electron-emission layer) having a dipole layer according to the present invention was manufactured. References in FIG. 10 are identical to those in FIG. 7.

Figure 10A:
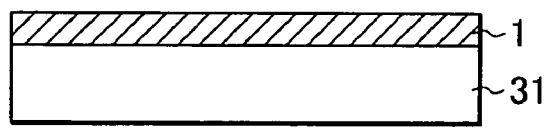
FIG. 10, consisting of FIGS. 10A to 10C, is a sectional schematic view of another example representing a manufacturing method of an electron emission device according to the present invention.
Figure 10B:
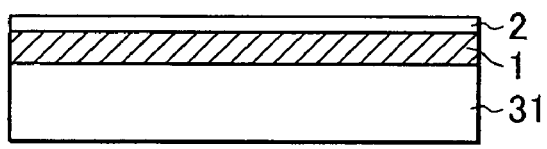

Using quartz as the substrate 31, a TiN film with a thickness of 500 nm was formed by sputtering as the cathode electrode 1 after the substrate 31 was sufficiently washed (FIG. 10A). The film forming conditions are as follows:
Rf power supply: 13.56 MHz
Rf power: 7.7 W/cm$^2$
gas pressure: 0.6 Pa
atmosphere gas: $N_2$/Ar ($N_2$:10%)
substrate temperature: room temperature
target: Ti Then, a carbon film was deposited with a thickness of 4 nm on the cathode electrode 1 by sputtering so as to form the insulation layer 2 (FIG. 10B). Using a graphite target as the target, the film was formed in an argon atmosphere.

Figure 10C:
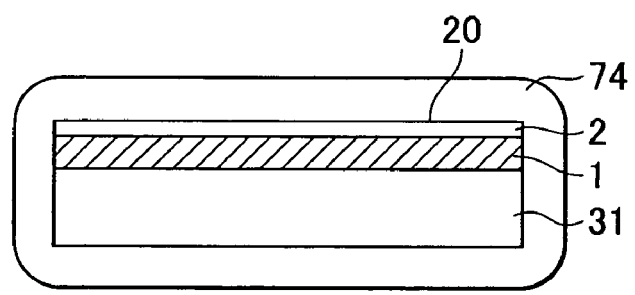
Figure 11A:
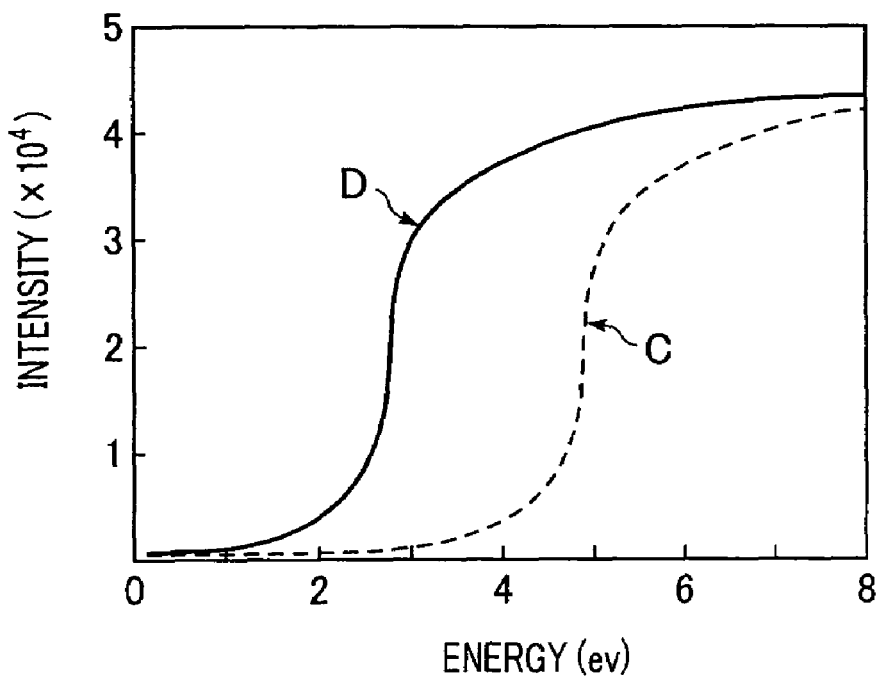
FIG. 11, consisting of FIGS. 11A and 11B, is a drawing showing an SES spectrum of an insulation layer in an Example 1 of the present invention.

Next, the above-mentioned insulation layer 2 was heat-treated in a mixed gas atmosphere of methane and hydrogen so as to form the dipole layer 20 at the surface of the insulation layer 2 (FIG. 10C). The heat treatment conditions are as follows:
heat treatment temperature: 600° C.
heating system: lamp heating
treatment time: 60 min
gas mixture ratio: methane/hydrogen=15/6
pressure during heating: 6.65 KPa A secondary electron energy spectrum (abbreviated as "SES" below) of the insulation layer 2 (electron emission film) having the dipole layer 20 obtained by the above manufacturing method is schematically shown in FIG. 11A.

The SES is obtained by irradiating a sample with an electron beam so as to measure the energy distribution of a secondary electron emitted in response thereto, and a work function of the sample can be estimated from the intercept of the SES.

Figure 11B:
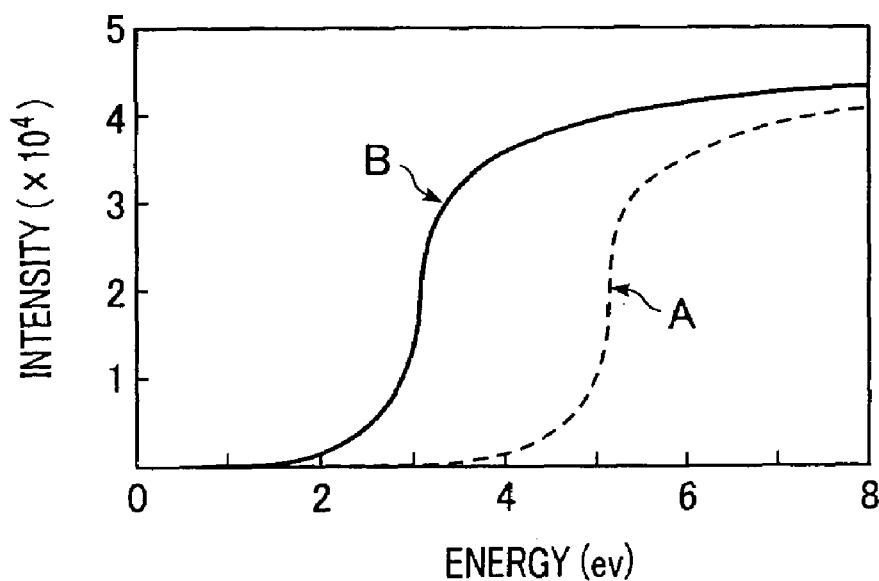

FIG. 11B schematically shows the SES of a diamond-like carbon (DLC) film as the reference. Character A of FIG. 11B indicates the SES of the DLC film, and character B the SES measured in a state that a bias voltage of 2 V is applied to the DLC film. As shown in FIG. 11B, it is understood that when a potential is applied on the surface of the DLC film, an apparent work function is reduced by the applied potential.

In the electron emission device according to the present invention, the band is bent by the dipole layer 20 formed at the surface (or on the surface) of the insulation layer 2 so as to facilitate an electron to be emitted. If such a phenomenon is acted in practice, a measured result of the sample SES is to be obtained as if a potential might be applied on the surface, as shown in FIG. 11B.

Character D of FIG. 11A indicates the SES of the insulation layer 2 having the dipole layer 20 produced in this example, and character C the SES of the insulation layer 2 without the dipole layer 20 in that only the heat-treatment was not performed. In FIG. 11A, the work function estimated from the SES is reduced by about 2 eV in the heat-treatment. If the result is examined in combination with the result from FIG. 11B, as described will respect to FIG. 2, it is understood that by the heat-treatment, the surface of the insulation layer 2 is chemically modified with hydrogen to form the dipole layer 20, so that the work function is reduced.

Figure 12:
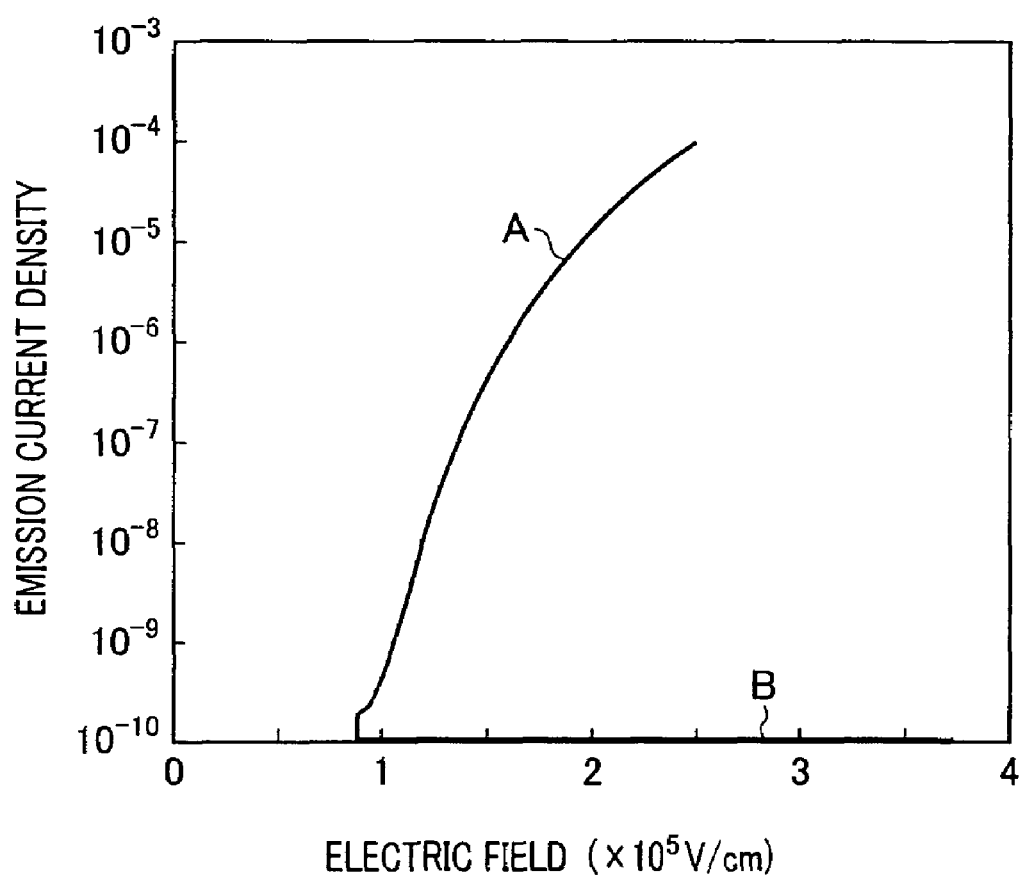
FIG. 12 is a drawing showing current/voltage characteristics when electrons are emitted from the insulation layer in Example 1 of the present invention.

Next, the electron emission characteristics of the insulation layer 2 produced in this Example were measured. The anode electrode (1 mm$^2$ area) was arranged so as to oppose the insulation layer 2 produced in the Example and to be separated therefrom, and a drive voltage was applied between the anode electrode and the cathode electrode. Voltage/current characteristics at this time are shown in FIG. 12, wherein the abscissa indicates the electric field intensity and the ordinate the emission current density. In FIG. 12, character A indicates the voltage/current characteristics of the insulation layer having the dipole layer 20 produced in this example, and character B indicates the voltage/current characteristics of the insulation layer 2 without the dipole layer 20 in that the heat-treatment was not performed in an atmosphere of methane and hydrogen.

The insulation layer 2 having the dipole layer 20 of the Example has a distinct threshold electric field, and it was confirmed that an electron was emitted with a low electric field intensity, showing excellent electron emission characteristics.

Example 2

According to the manufacturing method shown in FIG. 10, an insulation layer 2 having a dipole layer 20 according to the present invention was manufactured.

Using quartz as the substrate 31, a W film with a thickness of 500 nm was formed by sputtering as the cathode electrode 1 after the substrate 31 was sufficiently washed (FIG. 10A).

Then, $SiO_2$ was deposited with a thickness of about 4 nm on the cathode electrode 1 by sputtering so as to form the insulation layer 2 (FIG. 10B). Mixed gas of $Ar/O_2=1/1$ was used for an atmosphere gas. The conditions are as follows:

Rf power supply: 13.56 MHz
Rf power: 110 W/cm$^2$
gas pressure: 0.5 Pa
substrate temperature: 300° C.
target: $SiO_2$ Next, the substrate was heat-treated in a mixed gas atmosphere of methane and hydrogen so as to form the dipole layer 20 on the surface (or at the surface) of the insulation layer 2 (FIG. 10C). The heat treatment conditions are as follows:
heat treatment temperature: 600° C.
heating system: lamp heating
treatment time: 60 min
gas mixture ratio: methane/hydrogen=15/6
pressure during heating: 7 KPa The electron emission characteristics of the insulation layer 2 having the dipole layer 20 produced in such a manner were measured. The anode electrode was arranged so as to oppose the insulation layer 2 having the dipole layer 20 and to be separated therefrom, and a drive voltage was applied between the anode electrode and the cathode electrode. As a result, in the same way as in Example 1, excellent electron emission characteristics having a distinct threshold value and emitting electrons with a low electric field intensity were obtained.

Example 3

According to the manufacturing method shown in FIG. 7, an electron emission device of the invention was manufactured.

(Process 1)
Using quartz as the substrate 31, a TiN film with a thickness of 500 nm was formed by sputtering as the electrode layer 71 after the substrate 31 was sufficiently washed.

(Process 2)
Then, a carbon film was deposited with a thickness of about 6 nm by ECR plasma CVD (electron cyclotron resonance plasma chemical vapor deposition) so as to form a semiconductor layer 2 (FIG. 7A). This was under conditions that the DLC (diamond-like carbon) grows. The growing conditions are as follows:
gas: $CH_4$
microwave power: 400 W
substrate bias: −90 V
gas pressure: 25 mm Pa
substrate temperature: room temperature (Process 3)
Next, as shown in FIG. 7B, a positive-type photoresist (AZ® 1500 made by Clariant Co.) was spin-coated, exposed, and developed by photolithography so as to form a mask pattern (the photoresist 72).

(Process 4)
As shown in FIG. 7C, the DLC film and the TiN electrode were continuously dry-etched using the mask pattern as a mask. In order to reduce the leakage due to carbon slightly produced during the heat-treating of the gate electrode and the cathode electrode, the etching was performed slightly excessively to a degree of slightly etching the quartz.

(Process 5)
As shown in FIG. 7D, the mask pattern was completely removed.

(Process 6)

Figure 13:
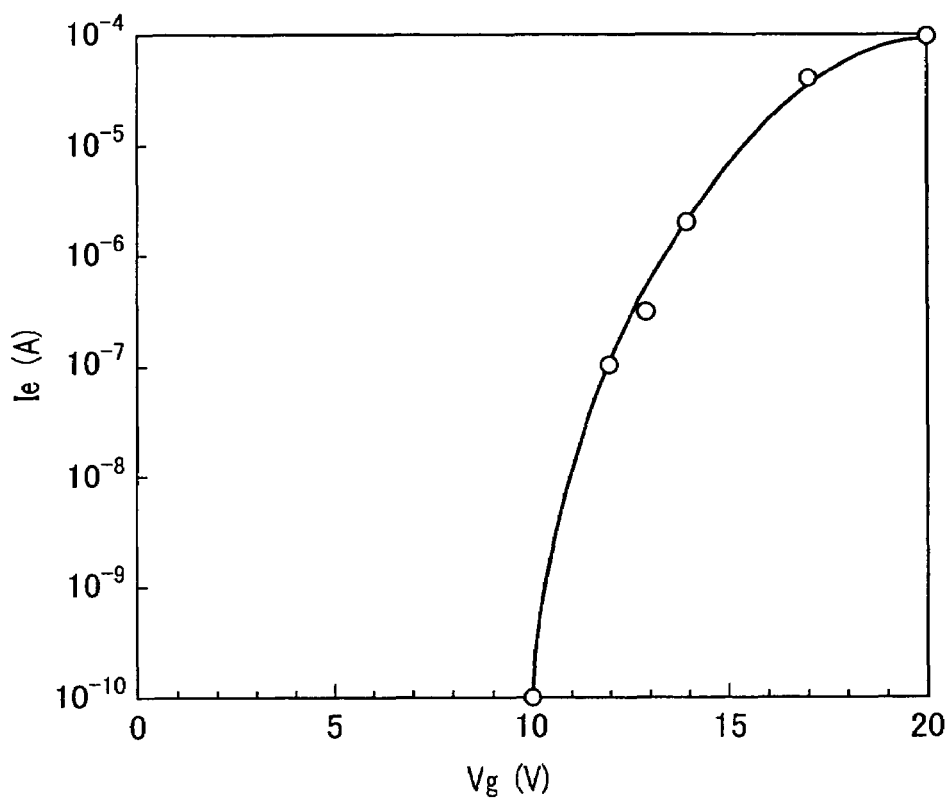
FIG. 13 is a drawing showing current/voltage characteristics of an electron emission device in Example 3 of the present invention.
Figure 14:
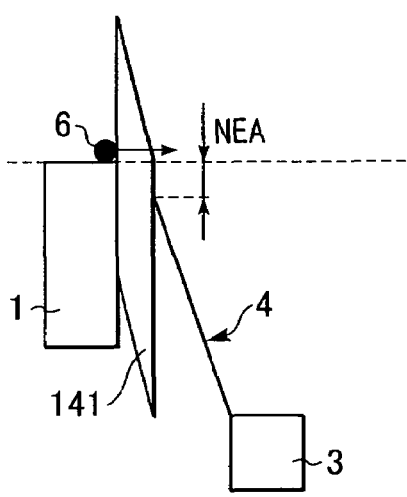
FIG. 14 is a band diagram for illustrating an electron emitting principle of a conventional electron emission device.
Figure 15:
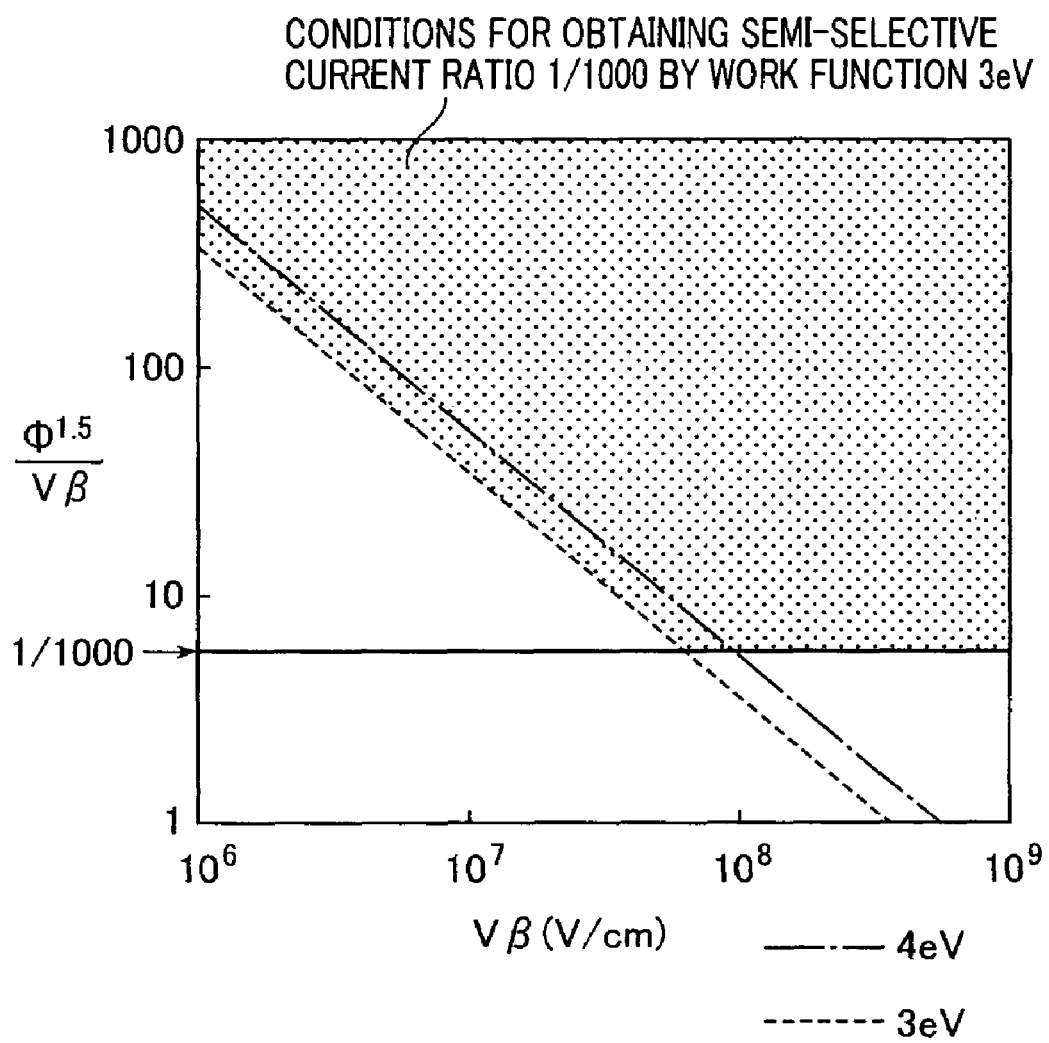
FIG. 15 is a drawing showing the range capable of obtaining a contrast ratio of 1/1000 in the electron emission device according to the present invention.

Finally, as shown in FIG. 7E, the substrate was heat-treated in a mixed gas atmosphere of methane and hydrogen so as to form the dipole layer 20 on the surface (or at the surface) of the insulation layer 2 and to complete the electron emission device. The heat treatment conditions are as follows:
heat treatment temperature: 600° C.
heating system: lamp heating
treatment time: 60 min
gas mixture ratio: methane/hydrogen=15/6
pressure during heating: 6 KPa Above the electron emission device manufactured as described above, as shown in FIG. 3, the anode electrode 33 was arranged, and voltages were applied between the cathode electrode 1 and the gate electrode 32 and across the anode electrode 33 so as to drive them. FIG. 13 is a graph of the voltage/current characteristics of the electron emission device. The electron emission device in the Example could emit electrons with a low voltage and have a distinct threshold value. The drive voltages in practice were a voltage Vg (voltage applied between the cathode electrode 1 and the gate electrode 32)=20 V and a voltage Va (voltage applied between the cathode electrode 1 and the anode electrode 33)=10 kV.

Example 4

An image display was manufactured using the electron emission device manufactured in the Example 3.

The electron emission devices manufactured in Example 3 were arranged in a matrix pattern of 100×100 so as to configure the electron source. As shown in FIG. 8, the wirings 82 in the X-direction were connected to the cathode electrode 1 while the wirings 83 in the Y-direction were connected to the gate electrode 32. In addition, FIG. 8 schematically shows that in the electron emission device 84, the gate electrode 32 having the opening 85 formed on the cathode electrode 1 is arranged; however, the electron emission device of the image display of the Example does not completely correspond to it. The structure of this Example is identical to the structure schematically shown in FIG. 8 except for the structure of the electron emission device (structure shown in Example 3). The electron emission devices in this Example were arranged at pitches of 300 μm by 300 μm. Above each electron emission device, any one of fluorescent materials emitting each of red, blue, and green light was arranged.

By "line-by-line driving" of the electron sources so as to display images, a high-brightness and high-fineness image display was obtained with excellent contrast.

Example 5

(Process 1)

First, as shown in FIG. 16A, using quartz as the substrate 31, after sufficiently washing it, TiN with a thickness of 500 nm was produced as the electrode layer 71 by sputtering.

(Process 2)

Then, carbon with a thickness of 50 nm was produced as the insulation layer 161 by sputtering. The carbon was modulated so as to have a resistance of $1 \times 10^6$ Ω.
target: graphite
gas: Ar
r. f. power: 500 W
gas partial pressure: 0.27 Pa (Process 3)

Next, carbon was deposited to have a carbon film with a thickness of about 6 nm as the insulation layer 2 by the ECR plasma CVD method. The film was formed under the condition that DLC grows at this time. The growing conditions are shown as follows:
gas: $CH_4$
microwave power: 400 W
substrate bias: −90 V
gas pressure: 25 mmPa
substrate temperature: room temperature (Process 4)

Then, as shown in FIG. 16B, by photolithography, a positive-type photoresist (AZ1500/made by Clariant Co.) was spin-coated, exposed, and developed by photolithography so as to form a mask pattern (the resist 72).

(Process 5)

As shown in FIG. 16C, using the mask pattern as a mask, the insulation layer 2, the resistance layer 161, and the electrode layer 71 were sequentially dry-etched, with layer 71 then forming elements 1 and 32. The etching was performed slightly excessively to a degree of slightly etching the quartz. In the example, the width of the opening 73 was set at 2 μm.

(Process 6)

As shown in FIG. 16D, the mask pattern was completely eliminated. The film stress was small and process problems such as film peeling did not arise.

(Process 7)

Finally, as shown in FIG. 16E, in a hydrogen atmosphere (99.9% hydrogen), the substrate was heat-treated at 630° C. for 60 min by a lamp so as to complete the electron emission device of the Example.

The anode electrode was arranged above the electron emission device produced as above, and the device was driven in the same way as in the Example 3. As a result, in the electron emission device of this Example, the temporal variation of an electric current emitting during the electron emission was alleviated in comparison with the electron emission device of the Example 3.

Example 6

(Process 1)

First, as shown in FIG. 17A, using quartz as the substrate 31, after sufficiently washing it, TiN with a thickness of 500 nm was produced as the electrode layer 71 by sputtering.

(Process 2)

Then, as shown in FIG. 17B, by the photolithography, a positive-type photoresist (AZ1500/made by Clariant Co.) was spin-coated, exposed, and developed by photolithography so as to form a mask pattern (the resist 72).

(Process 3)

As shown in FIG. 17C, using the mask pattern as a mask, the electrode layer 71 was dry-etched. The etching was performed slightly excessively to a degree of slightly etching the quartz.

(Process 4)

Next, carbon was formed to have a carbon film with a thickness of 50 nm as the resistance layer 161 by sputtering.

The carbon at this time was modulated so as to have a resistance of $1\times10^7$ Ω.
target: graphite
gas: Ar
r. f. power: 500 W
gas partial pressure: 0.27 Pa (Process 5)

Next, carbon was deposited to have a carbon film with a thickness of about 6 nm as the insulation layer 2 by the ECR plasma CVD method. The film was formed under the condition that DLC grows at this time. The growing conditions are shown as follows:
gas: $CH_4$
microwave power: 400 W
substrate bias: −90 V
gas pressure: 25 mmPa
substrate temperature: room temperature (Process 6)

Then, as shown in FIG. 17F, by photolithography, a positive-type photoresist (AZ1500/made by Clariant Co.) was spin-coated, exposed, and developed by photolithography so as to form a mask pattern (resist 72').

(Process 7)

As shown in FIG. 17G, using the mask pattern as a mask, the insulation layer 2 and the resistance layer 161 were sequentially dry-etched, and then, the mask pattern was completely eliminated. In the example, the width of the opening 73 was set at about 1 µm. The film stress was small and process problems such as film peeling did not arise.

(Process 8)

Finally, as shown in FIG. 17H, in a hydrogen atmosphere (99.9% hydrogen), the substrate was heat-treated at 630° C. for 60 min by a lamp so as to complete the electron emission device of the Example.

The anode electrode was arranged above the electron emission device produced as above, and the device was driven in the same way as in the Example 3. As a result, in the electron emission device of this Example, the temporal variation of an electric current emitting during the electron emission was alleviated in comparison with the electron emission device of the Example 5.

Example 7

In this Example, electron sources were manufactured by arranging a number of electron emission devices respectively produced in Example 5 and Example 6, and image displays using the respective electron sources were manufactured.

In the respective electron sources, each electron source was manufactured in the same way as in Example 4 other than the structure of each electron emission device. Then, when images were displayed by line-sequentially driving the electron source, high-brightness and fine images excellent in contrast could be stably displayed for a long period.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electron-emitting device comprising:
a cathode electrode:
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer, and
the insulation layer has a thickness that is not more than 10 nm.

2. An electron-emitting device comprising:
a cathode electrode;
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer, and
wherein the dipole layer is formed by terminating the surface of the insulation layer with hydrogen.

3. An electron-emitting device comprising:
a cathode electrode;
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer, and
wherein the surface of the insulation layer has a positive electron affinity during the electron emission.

4. An electron-emitting device comprising:
a cathode electrode;
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer,
wherein the insulation layer contains carbon as a principal ingredient, and
wherein the carbon, contains an $sp^3$ hybrid orbital structure carbon as a principal ingredient.

5. An electron-emitting device comprising:
a cathode electrode;
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer, and
wherein a Root-Mean-Square surface roughness of the insulation layer is smaller than one tenth of a film thickness of the insulation layer.

6. An electron-emitting device comprising:
a cathode electrode;
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer, and
wherein a Root-Mean-Square surface roughness of the cathode electrode is smaller than one tenth of a film thickness of the insulation layer.

7. An electron-emitting device comprising:
a cathode electrode;
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer, and
wherein a Root-Mean-Square surface roughness of the cathode electrode is not more than 1 nm.

8. An electron-emitting device comprising:
a cathode electrode;
an insulation layer covering at least part of a surface of the cathode electrode and having a dipole layer formed on its surface;
an extraction electrode; and
a substrate upon which the cathode electrode and the extraction electrode are arranged, wherein the extraction electrode and the cathode electrode are separated by a spatial interval,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer.

9. An electron-emitting device according to claim 8, wherein a surface of the substrate disposed between the cathode electrode and the extraction electrode is provided with a recess therein.

10. An electron-emitting device according to claim 8, wherein at least part of the insulation layer is arranged on a surface of the cathode electrode opposing the extraction electrode.

11. An electron-emitting device according to claim 8, wherein the insulation layer is not in contact with the substrate.

12. An electron-emitting device according to claim 8, wherein the insulation layer does not cover at least part of a surface of the cathode electrode opposing the extraction electrode.

13. An electron-emitting device comprising:
a cathode electrode;
an insulation layer covering at least part of a surface of the cathode electrode and having a dipole layer formed on its surface; and
an extraction electrode,
wherein an electron emission to vacuum, by quantum-mechanical tunneling through the insulation layer and a vacuum barrier by applying a voltage between the cathode electrode and the extraction electrode, takes place in a condition that the vacuum barrier in contact with the dipole layer is higher than a conduction band on the surface of the insulation layer, and
wherein the extraction electrode is disposed above the cathode electrode and has an opening for passing an electron therethrough, and the insulation layer also has an opening corresponding to the opening of the extraction electrode.

14. An electron-emitting device according to any one of claims 1–3, 5–8 or 13, wherein the insulation layer contains carbon as a principal ingredient.

15. An electron-emitting device according to claim 14,
wherein the carbon, which is the principal ingredient of the insulation layer contains an $sp^3$ hybrid orbital structure carbon as a principal ingredient.

16. An electron source comprising a plurality of electron emission devices, each of the plurality of electron-emitting devices is constituted by the electron-emitting device according to any one of claims 1–3, 4, 5–8 or 13.

17. An image display comprising an electron source according to claim 16 and a luminous body.

18. A data displaying and/or playing apparatus comprising an image display, a receiver for receiving an information signal, a tuner and a driver for driving the image display, wherein the image display is constituted by the image display according to claim 17.

* * * * *

UNITED STATES PATENT AND TRADEMARK OFFICE
CERTIFICATE OF CORRECTION

| | | |
|---|---|---|
| PATENT NO. | : 7,109,663 B2 | |
| APPLICATION NO. | : 10/853180 | |
| DATED | : September 19, 2006 | |
| INVENTOR(S) | : Ryoji Fujiwara et al. | |

It is certified that error appears in the above-identified patent and that said Letters Patent is hereby corrected as shown below:

ON THE TITLE PAGE [57] ABSTRACT:

Line 4, "electrode," (first occurrence) should read --electrode and-- and "electrode," (second occurrence) should read --electrode--.

COLUMN 1:

Line 45, "Zhinov. J. Liu" should read --Zhirnov--; and
Line 47, "and" should be deleted.

COLUMN 2:

Line 25, "as" should be deleted; and
Line 31, "as" should be deleted.

COLUMN 7:

Line 18, "level(surface" should read --level (surface--;
Line 47, "if" should read --it--; and
Line 55, "amount(i.e.," should read --amount (i.e.,--.

COLUMN 9:

Line 2, "electrode" should read --electrode 1--;
Line 7, "substrate 1)" should read --substrate 31--; and
Line 59, "6;" should read --6.--.

COLUMN 11:

Line 60, "includes" should read --include-- and "(diamond like" should read --(diamond-like--.

COLUMN 15:

Line 30, "will" should read --with--.

UNITED STATES PATENT AND TRADEMARK OFFICE
CERTIFICATE OF CORRECTION

PATENT NO. : 7,109,663 B2
APPLICATION NO. : 10/853180
DATED : September 19, 2006
INVENTOR(S) : Ryoji Fujiwara et al.

It is certified that error appears in the above-identified patent and that said Letters Patent is hereby corrected as shown below:

COLUMN 18:

Line 17, "resist" should read --photoresist--; and
Line 57, "resist" should read --photoresist--.

COLUMN 19:

Line 23, "(resist" should read --(photoresist--.

COLUMN 20:

Line 66, "carbon," should read --carbon--.

COLUMN 22:

Line 44, "layer" should read --layer,--; and
Line 49, "claims 1-3, 4, 5-8" should read --claims 1-8 or 13--.

Signed and Sealed this

Fifth Day of August, 2008

JON W. DUDAS
*Director of the United States Patent and Trademark Office*